United States Patent
Bektas et al.

(10) Patent No.: US 9,075,679 B1
(45) Date of Patent: Jul. 7, 2015

(54) CREATING A PREREQUISITE CHECKLIST CORRESPONDING TO A SOFTWARE APPLICATION

(71) Applicant: International Business Machines Corporation, Armonk, NY (US)

(72) Inventors: Umit Bektas, Crakow (PL); Pawel Januszek, Crakow (PL); Piotr Kania, Crakow (PL); Konrad K. Skibski, Crakow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/475,608

(22) Filed: Sep. 3, 2014

Related U.S. Application Data

(63) Continuation of application No. 14/135,312, filed on Dec. 19, 2013.

(51) Int. Cl.
  *G06F 9/44* (2006.01)
  *G06F 9/445* (2006.01)

(52) U.S. Cl.
  CPC ... *G06F 8/61* (2013.01); *G06F 8/70* (2013.01)

(58) Field of Classification Search
  None
  See application file for complete search history.

(56) References Cited

U.S. PATENT DOCUMENTS

| | | | |
|---|---|---|---|
| 6,618,857 B1 | 9/2003 | Zimniewicz et al. | |
| 7,093,247 B2 | 8/2006 | Ashworth et al. | |
| 7,624,086 B2 | 11/2009 | Keith, Jr. | |
| 7,739,377 B2* | 6/2010 | Benedetti et al. | 709/224 |
| 7,849,460 B1* | 12/2010 | Martin et al. | 717/174 |
| 8,209,679 B2 | 6/2012 | Long | |
| 8,214,690 B2 | 7/2012 | Lamberg et al. | |
| 2005/0223101 A1* | 10/2005 | Hayes, Jr. | 709/228 |
| 2006/0026463 A1* | 2/2006 | Paliwal et al. | 714/37 |
| 2006/0224544 A1* | 10/2006 | Keith, Jr. | 706/60 |
| 2011/0029946 A1 | 2/2011 | Joukov et al. | |
| 2011/0154317 A1* | 6/2011 | Madduri et al. | 717/174 |
| 2012/0151455 A1* | 6/2012 | Tsantilis et al. | 717/132 |
| 2013/0152047 A1 | 6/2013 | Moorthi et al. | |

OTHER PUBLICATIONS

U.S. Appl. No. 14/135,312, entitled "Creating a Prerequisite Checklist Corresponding to a Software Application" filed Dec. 19, 2013.

* cited by examiner

*Primary Examiner* — Philip Wang
(74) *Attorney, Agent, or Firm* — Daniel R. Simek

(57) ABSTRACT

Embodiments of the present invention disclose a computer implemented method, computer program product, and system for creating a prerequisite checklist corresponding to a software application. In one embodiment, in accordance with the present invention, the computer implemented method includes the steps of identifying prerequisites of a software application that are present in source code of the software application, wherein the prerequisites are software and hardware components, and creating a prerequisite checklist that includes the identified prerequisites of the software application, wherein the prerequisite checklist is in a file format that is compatible with prerequisite checking software. In another embodiment, the computer implemented method includes the steps of analyzing a computer system utilizing the created prerequisite checklist as an input file into prerequisite checking software, and determining whether the computer system is capable if installing and running the software application.

7 Claims, 3 Drawing Sheets

CREATING A PREREQUISITE CHECKLIST CORRESPONDING TO A SOFTWARE APPLICATION

FIELD OF THE INVENTION

The present invention relates generally to the field of software installation, and more particularly to creating a prerequisite checklist.

BACKGROUND

Prerequisite checking software is run in connection with installation of a software application to determine whether all prerequisites are present in the system (e.g., personal computer, laptop, or other computing devices) that the software application is being installed on. The software application may require that certain software and hardware components are present and up to date on the system that is installing the software application. The prerequisite checking software determines whether the system includes all hardware and software requirements that are necessary to install and run the application. For example, a software prerequisite can be a specific program, a specific version of a program (e.g., the most up to date version), and a hardware prerequisite can be a minimum amount of disk storage space, a minimum amount of memory, etc.

Prerequisite checking software can utilize an input file of a prerequisite checklist that includes a listing of all software and hardware prerequisites that correspond to an application. When an application is updated, a new prerequisite checklist needs to be created that includes the most up to date information on the hardware and software prerequisites of the updated version of the application. Prerequisite checking software can be utilized to analyze a computer system before starting a new installation, responsive to a failed installation attempt, and for the installation of an upgrade to an application

SUMMARY

Embodiments of the present invention disclose a computer implemented method, computer program product, and system for creating a prerequisite checklist corresponding to a software application. In one embodiment, in accordance with the present invention, the computer implemented method includes the steps of identifying prerequisites of a software application that are present in source code of the software application, wherein the prerequisites are software and hardware components, and creating a prerequisite checklist that includes the identified prerequisites of the software application, wherein the prerequisite checklist is in a file format that is compatible with prerequisite checking software. In another embodiment, the computer implemented method includes the steps of analyzing a computer system utilizing the created prerequisite checklist as an input file into prerequisite checking software, and determining whether the computer system is capable of installing and running the software application.

DETAILED DESCRIPTION

Figure 1:
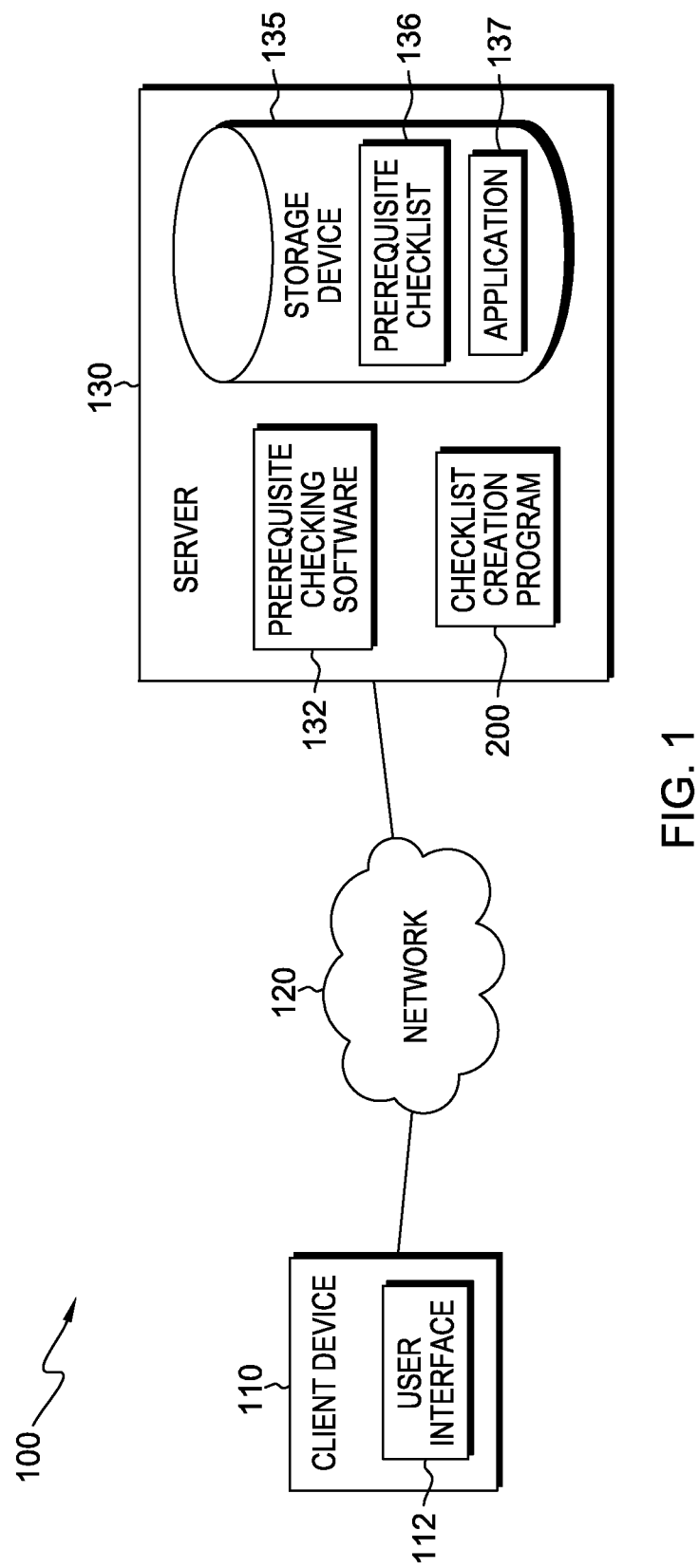
FIG. 1 is a functional block diagram of a data processing environment in accordance with an embodiment of the present invention.

Embodiments of the present invention allow for creation of a prerequisite checklist corresponding to a software application. The prerequisite checklist is based on the source code of the software application. In one embodiment, each prerequisite that is present in the source code of the application is identified, and included in the prerequisite checklist. The prerequisite checklist can be utilized by prerequisite checking software to determine whether a computer system includes all of the hardware and software requirements that are necessary to install and run the application.

Embodiments of the present invention recognize that each time that an application is created or updated, a new corresponding prerequisite checklist is created, or a pre-existing version is updated, to reflect the hardware and software requirements of the application. Creating or updating a prerequisite checklist manually can be a time consuming process. Testing whether or not a prerequisite checklist covers all possible hardware and software prerequisites can be a difficult process. A manually created prerequisite checklist may unintentionally omit a rarely needed prerequisite, which may not become apparent during testing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data processing environment 100, in accordance with one embodiment of the present invention.

An embodiment of data processing environment 100 includes client device 110 and server 130, interconnected over network 120. In an example embodiment, client device 110 accesses server 130, through network 120, to download and install an application (e.g., application 137), or to update an application to a current version. In various embodiments of the present invention, client device 110 may be a workstation, personal computer, personal digital assistant, mobile phone, or any other device capable of executing program instructions in accordance with embodiments of the present invention. In general, client device 110 is representative of any electronic device or combination of electronic devices capable of executing machine-readable program instructions, as described in greater detail with regard to FIG. 3, in accordance with embodiments of the present invention. Client device 110 includes user interface 112, which accepts input from individuals utilizing client device 110. For example, client device 110 accesses server 130 to download application 137 responsive to input of an individual utilizing client device 110 into user interface 112.

In one embodiment, client device 110 and server 130 communicate through network 120. Network 120 can be, for example, a local area network (LAN), a telecommunications network, a wide area network (WAN) such as the Internet, or a combination of the three, and include wired, wireless, or fiber optic connections. In general, network 120 can be any combination of connections and protocols that will support communications between client device 110 and server 130 in accordance with embodiments of the present invention.

In one embodiment, server 130 can be any type of server that hosts and provides applications for download (e.g., for download on to client device 110), via network 120. In example embodiments, server 130 can be a desktop computer, computer server, or any other computer system known in the art capable of performing functions in accordance with embodiments of the present invention. In certain embodiments, server 130 represents computer systems utilizing clustered computers and components (e.g., database server computers, application server computers, etc.) that act as a single pool of seamless resources when accessed by elements of data processing environment 100 (e.g., client device 110). In general, server 130 is representative of any electronic device or combination of electronic devices capable of executing machine-readable program instructions, as described in greater detail with regard to FIG. 3, in accordance with embodiments of the present invention.

Server 130 includes prerequisite checking software 132, storage device 135, and checklist creation program 200. Prerequisite checking software 132 determines whether a computer system (e.g., client device 110) includes all hardware and software requirements that are necessary to install and run a software application (e.g., application 137). Prerequisite checking software 132 utilizes an input file of a prerequisite checklist (e.g., prerequisite checklist 136), which includes a listing of all software and hardware prerequisites that correspond to an application. In example embodiments, checklist creation program 200 analyzes the source code of an application to create a prerequisite checklist that corresponds to the application, in accordance with embodiments of the present invention. Storage device 135 can be implemented with any type of storage device, for example, persistent storage 308, which is capable of storing data that may be accessed and utilized by client device 110 and server 130, such as a database server, a hard disk drive, or flash memory. In other embodiments, storage device 135 can represent multiple storage devices within server 130.

In one embodiment, storage device 135 includes prerequisite checklist 136 and application 137. In an example embodiment, prerequisite checklist 136 includes a listing of all software and hardware prerequisites that correspond to application 137. Prerequisite checklist 136 can be utilized as an input file into prerequisite checking software 132. Prerequisite checklist 136 is stored in storage device 135, and associated with the corresponding application (e.g., application 137). Application 137 can be any form of software application that client device 110 can download and install. In example embodiments, application 137 includes source code that checklist creation program 200 can assess and analyze. For example, checklist creation program 200 analyzes source code of application 137 to create a corresponding instance of prerequisite checklist 136. Then prerequisite checking software 132 can utilize prerequisite checklist 136 to determine whether client device 110 is capable of installing application 137.

Figure 2:
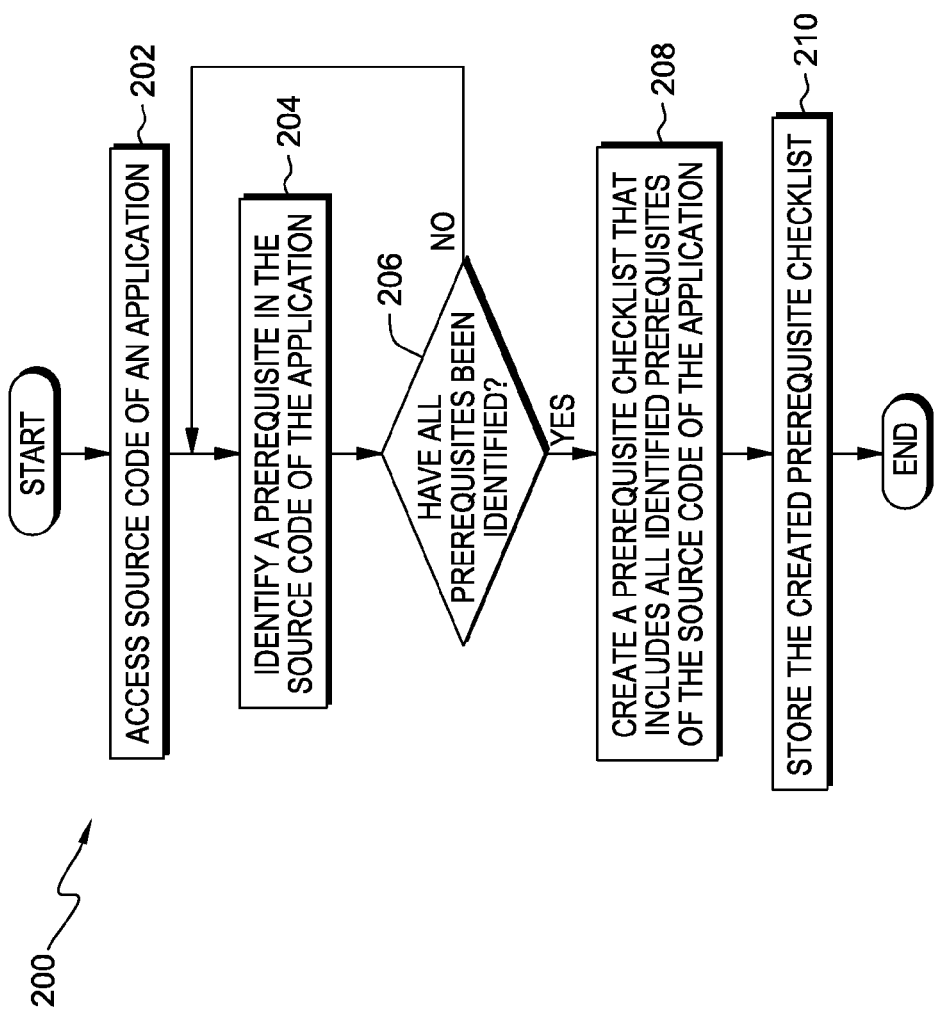
FIG. 2 is a flowchart depicting operational steps of a program for creating a prerequisite checklist corresponding to a software application, in accordance with an embodiment of the present invention.

FIG. 2 is a flowchart depicting operational steps of checklist creation program 200 in accordance with an embodiment of the present invention. In one embodiment, checklist creation program 200 initiates responsive to receiving an indication to create a prerequisite checklist, or an addition of a new application (or a new version of an application) to storage device 135. For example, a developer of an application (e.g., application 137) can request to have checklist creation program 200 analyze the source code of the application to create a prerequisite checklist (e.g., prerequisite checklist 136). In another embodiment, checklist creation program 200 can operate as a component of the compiling and build process of an application, and the development of the source code for the application (e.g., application 137).

In step 202, checklist creation program 200 accesses the source code of an application. In one embodiment, checklist creation program 200 accesses the source code of application 137, including all program code of application 137 and associated components. In example embodiments, application 137 can include an indication of prerequisite detection information (i.e., information on how to identify and interpret prerequisites). Prerequisite detection information can include information on how to identify and interpret annotations associated with the source code that indicate prerequisites of the application (i.e., the annotation syntax), and information on how specific commands in the source code correspond to, and indicate a prerequisite. In another embodiment, prerequisite detection information can include validation instructions that indicate how to determine whether a prerequisite is present in a computer system (e.g., a script or program code for checking whether a specific version of a specific library is present in client device 110).

In step 204, checklist creation program 200 identifies a prerequisite in the source code of the application. In one embodiment, checklist creation program 200 identifies references to external objects in the source code of application 137 (e.g., a reference for the source code to utilize something that is not present within the application). The identified prerequisites can be associated with software or hardware. Checklist creation program 200 can utilize prerequisite detection information that is associated with application 137.

In one example, checklist creation program 200 identifies a prerequisite in the source code of application 137 utilizing annotations that are associated with the source code. The annotations can be provided by a developer of application 137, and included within the source code. In this example, checklist creation program 200 identifies a prerequisite when an annotation is present in the source code, and includes an indication of a prerequisite. If checklist creation program 200 identifies an annotation that indicates that application 117 requires version 9.5 of Software D, the checklist creation program 200 identifies "Software D, version 9.5" as a prerequisite. In an embodiment, checklist creation program 200 can utilize annotation syntax to validate prerequisites in the source code of application 137.

In another example, checklist creation program 200 identifies a prerequisite in the source code of application 137 utilizing commands in the source code. The commands in the source code reference that the installation or operation of application 137 utilizes an object that should be present in the computer system (i.e., client device 110). In this example, if checklist creation program 200 identifies a command in the source code of application 137 that is specific to Software N, then checklist creation program 200 identifies "Software N" as a prerequisite. In example embodiments, checklist creation program 200 can utilize annotations in the source code, or commands in the source code, or both.

In decision step 206, checklist creation program 200 determines whether all prerequisites have been identified. In one embodiment, checklist creation program 200 determines whether all the prerequisites present in the source code of application 137 have been identified. In an example embodiment, checklist creation program 200 starts analyzing the source code at the beginning of the source code to identify prerequisites. Checklist creation program 200 can determine that all prerequisites have been identified when checklist creation program 200 cannot identify another prerequisite (subsequent to the prerequisite identified in step 204), or upon reaching the termination point of the source code. Responsive to determining that not all prerequisites have been identified, checklist creation program 200 returns to step 204 (decision step 206, "no" branch).

In step 208, checklist creation program 200 creates a prerequisite checklist that includes all identified prerequisites of the source code of the application. In one embodiment, responsive to determining that all prerequisites have been identified (decision step 206, "yes" branch), checklist creation program 200 creates prerequisite checklist 136. Prerequisite checklist 136 includes all identified prerequisites of application 137, which are identified in each instance of step 204. In another embodiment, checklist creation program 200 can create prerequisite checklist 136 with component specific portions that correspond to components within application 137. The component specific portions allow prerequisite checking software 132 to check only whether a relevant subset of the prerequisites are present in client device 110, depending on which components client device 110 is going to install. Checklist creation program 200 creates prerequisite checklist 136 in any file format that prerequisite checking software 132 can utilize (e.g., Extensible Markup Language (XML) or other known file formats). Since prerequisite checklist 136 is based on the current source code of application 137, prerequisite checklist 136 is up to date with the current version of application 137. In another embodiment, prerequisite checklist 136 includes validation instructions, which can be included in the prerequisite detection information.

In step 210, checklist creation program 200 stores the created prerequisite checklist. In one embodiment, checklist creation program 200 stores prerequisite checklist 136 in storage device 135 associated with the corresponding application (i.e., application 137). Prerequisite checklist 136 is stored in a file format that is compatible with prerequisite checking software 132 (e.g., XML). Prerequisite checking software 132 can access and utilize prerequisite checklist 136.

In an example, prerequisite checking software 132 utilizes an input file of prerequisite checklist 136 (created by checklist creation program 200) to determine whether or not client device 110 is capable of installing and running application 136. In this example, prerequisite checking software 132 determines whether all prerequisites in prerequisite checklist 136 are present on client device 110 (e.g., Software N, version 9.5 of Software D, etc.). In various embodiments, prerequisite checklist 136 includes validation instructions, which can be utilized by prerequisite checking software 132. If prerequisite checking software 132 determines that all the prerequisites in prerequisite checklist 136 are present in client device 110, then application 137 can be installed on client device 110. If prerequisite checking software 132 determines that not all of the prerequisites in prerequisite checklist 136 are present in client device 110, then the missing prerequisites need to be resolved prior to installing application 137. In another embodiment, an instance of prerequisite checking software 132 can be generated based on prerequisite checklist 136 (i.e., a custom instance of prerequisite checking software 132 corresponding to application 137).

In another embodiment, during the development process of application 137 (e.g., on a development computing system), checklist creation program 200 operates to analyze application 137 and create a corresponding instance of prerequisite checklist 136. Then, responsive to receiving a request to install application 137 from a user (e.g., client device 110), the created instance of prerequisite checklist 137 is bundled along with the executable version of application 137 to be installed on the computing device of the user. During the installation process of application 137 on a computing system (e.g., client device 110) an instance of prerequisite checking software 132, which may be present on the computing system, utilizes the created instance of prerequisite checklist 136 to determine whether or not the prerequisites for application 137 are present on the computing system. In an example embodiment, checklist creation program 200 and source code of application 137 do not need to be present on the computer system installing application 137 (e.g., client device 110), and can be located on another computing system (e.g., server 130, connected to client device 110 via server 130).

Figure 3:
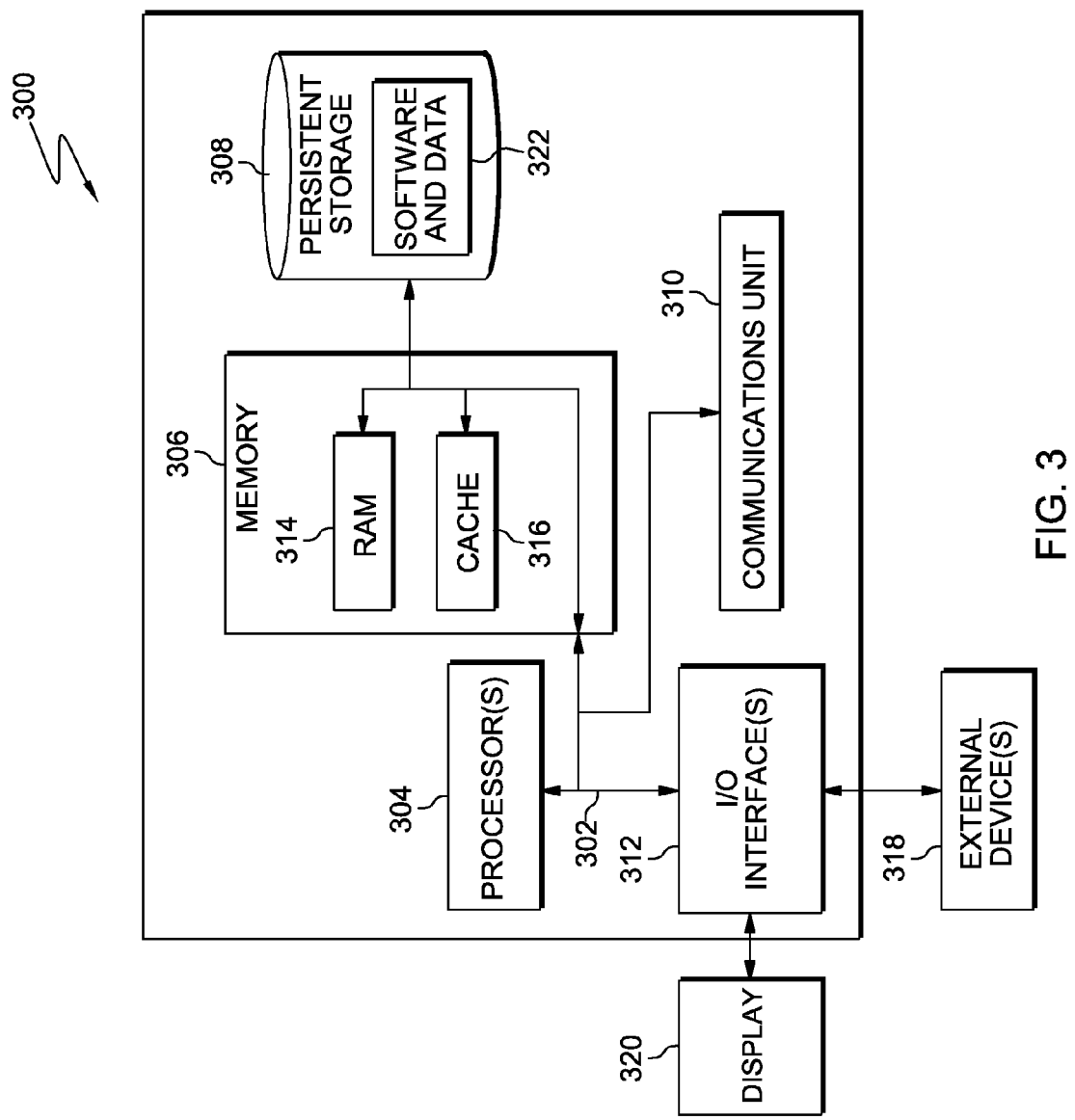
FIG. 3 depicts a block diagram of components of the computing system of FIG. 1 in accordance with an embodiment of the present invention.

FIG. 3 depicts a block diagram of components of computer 300, which is representative of client device 110 and server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are examples of computer-readable tangible storage devices. A storage device is any piece of hardware that is capable of storing information, such as, data, program code in functional form, and/or other suitable information on a temporary basis and/or permanent basis. In this embodiment, memory 306 includes random access memory (RAM) 314 and cache memory 316. In general, memory 306 can include any suitable volatile or non-volatile computer-readable storage device. Software and data 322 are stored in persistent storage 308 for access and/or execution by processors 304 via one or more memories of memory 306. With respect to server 130, software and data 322 represents prerequisite checking software 132, prerequisite checklist 136, application 137, and checklist creation program 200.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data 322 can be stored on such portable computer-readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating a prerequisite checklist corresponding to a software application, the method comprising the steps of:
    identifying, by one or more processors, prerequisites of a software application that are present in source code of the software application, wherein the prerequisites are software and hardware components;
    identifying, by one or more processors, prerequisite detection information associated with the source code of the software application, wherein the prerequisite detection information includes one or more of: information on how to identify and interpret annotations associated with the source code of the software application that indicate prerequisites, information on how commands in the source code of the software application correspond to and indicate a prerequisite, and validation instructions that indicate how to determine whether a prerequisite is present in a computer system; and
    creating, by one or more processors, a prerequisite checklist that includes the identified prerequisites of the software application, wherein the prerequisite checklist is in a file format that is compatible with prerequisite checking software.

2. The method in accordance with claim 1, further comprising the steps of:
    analyzing, by one or more processors, a computer system utilizing the created prerequisite checklist as an input file into prerequisite checking software; and
    determining, by one or more processors, whether the computer system is capable of installing and running the software application.

3. The method in accordance with claim 1, wherein the step of identifying prerequisites of the software application that are present in the source code of the software application, further comprises the steps of:
    identifying, by one or more processors, annotations associated with the source code of the software application that indicate prerequisites; and
    determining, by one or more processors, prerequisites that correspond to the identified annotations.

4. The method in accordance with claim 1, wherein the step of identifying prerequisites of the software application that are present in the source code of the software application, further comprises the steps of:
    identifying, by one or more processors, commands in the source code of the software application that correspond to, and indicate a prerequisite; and
    determining, by one or more processors, prerequisites that correspond to the identified commands.

5. The method in accordance with claim 1, further comprising the step of:
    creating, by one or more processors, a customized prerequisite checking software based on the created prerequisite checklist.

6. The method in accordance with claim 1, wherein the created prerequisite checklist includes component specific portions that correspond to components of the software application.

7. The method in accordance with claim 1, wherein the created prerequisite checklist include validation instructions that indicate how to determine whether a prerequisite is present in a computer system.

* * * * *